June 13, 1972     S. H. COWEN     3,669,822

FILM-TISSUE PAPER ADHESIVE LAMINATES

Original Filed Nov. 29, 1968     2 Sheets-Sheet 1

INVENTOR
SAMUEL H. COWEN

BY Eugene M. Bond
ATTORNEY

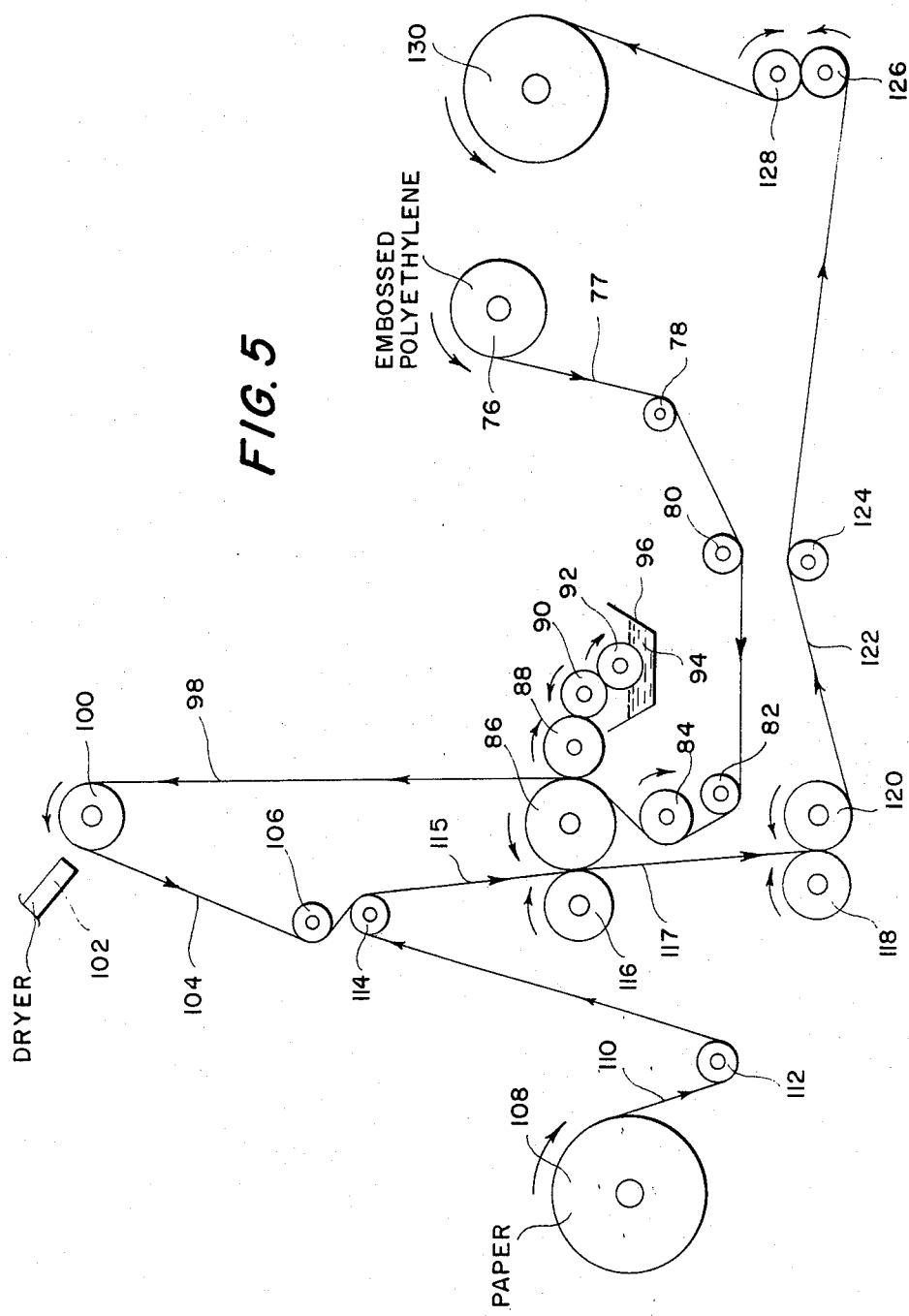

United States Patent Office 3,669,822
Patented June 13, 1972

3,669,822
FILM-TISSUE PAPER ADHESIVE LAMINATES
Samuel H. Cowen, Southfield, Mich., assignor to
Chemed Corporation, Cincinnati, Ohio
Continuation-in-part of application Ser. No. 780,075, Nov. 29, 1968, which is a continuation-in-part of application Ser. No. 695,710, Jan. 4, 1968. This application Jan. 11, 1971, Ser. No. 105,480
Int. Cl. B32b 3/28
U.S. Cl. 161—130                          5 Claims

ABSTRACT OF THE DISCLOSURE

The invention disclosed is an adhesively bound laminate formed of a thin thermoplastic film pre-embossed throughout substantially the entire surface area, and having at least one tissue paper layer adhesively bound thereto by means of an aqueous-base adhesive composition.

---

This application is a continuation-in-part of copending U.S. application Ser. No. 780,075 filed Nov. 29, 1968, now abandoned, which in turn is a continuation-in-part of U.S. application Ser. No. 695,710, filed Jan. 4, 1968, now abandoned.

The present invention relates to a laminate of thin thermoplastic film, especially polyolefins such as polyethylene, adhesively bound to a layer of tissue paper and especially adapted for use in the fabrication of disposable garments, bed linen and the like.

Various methods have heretofore been proposed for applying film-like coatings of thermoplastic resins to webs formed of porous sheet materials. Such prior art methods, however, have been subject to the disadvantage that the resulting sheet or laminate has relatively poor adhesion of the component layers. Attempts have been made to increase the adhesion of the component layers by increasing the pressure of calendering rolls acting on the laminate during formation and thereby increase the bond between the polymer and the sheet material. These attempts have realized limited success and have required the use of relatively expensive equipment. It has now been found that by the practice of the present invention, a new plastic film-tissue paper laminate is provided which is more clothlike than related laminates prepared heretofore and thus especially suitable for use in preparing disposable gowns or other garments and which is also suitable for use as disposable bed linen and the like.

Generally stated, the present invention provides an adhesively bound laminate formed of a thin thermoplastic film pre-embossed throughout substantially the entire surface area, and having at least one tissue paper layer adhesively bound thereto by means of an aqueous-base adhesive. The method of the present invention generally involves continuously passing a thin thermoplastic film from a supply roll through an embossing station, applying adhesive to the embossed film, contacting said adhesive coated surface of embossed film with a tissue paper layer continuously received from a supply roll, pressure mating the tissue paper layer to the thermoplastic film, and receiving the thus formed laminate at a roll station. The thus formed laminate is found to have good drape or more clothlike qualities; improved cohesion of the layer components; better laminate appearance, feelability and softness than competitive laminates prepared heretofore.

In an embodiment, the present method includes an additional means for continuously supplying a tissue paper layer which is adhesively bonded to the second surface of the thermoplastic film said to form a tissue paper/thermoplastic film/tissue paper laminate.

Disposable garments and the like made from paper or from thin polyolefin films such as polyethylene are known in the prior art. Likewise, paper-polyethylene laminates of various types and properties are known to the art. These known laminates are typically prepared by extrusion lamination techniques whereby a very strong physical bonding between a relatively thick layer of the hot thermoplastic and the fibers of the paper layer is achieved. One disadvantage of such laminates, however, is that they generally do not have accessible drape or clothlike qualities.

The present invention will be described in greater detail in the following description taken in connection with the accompanying drawing wherein like elements are designated by similar numerals throughout the several views in which.

Figure 1:
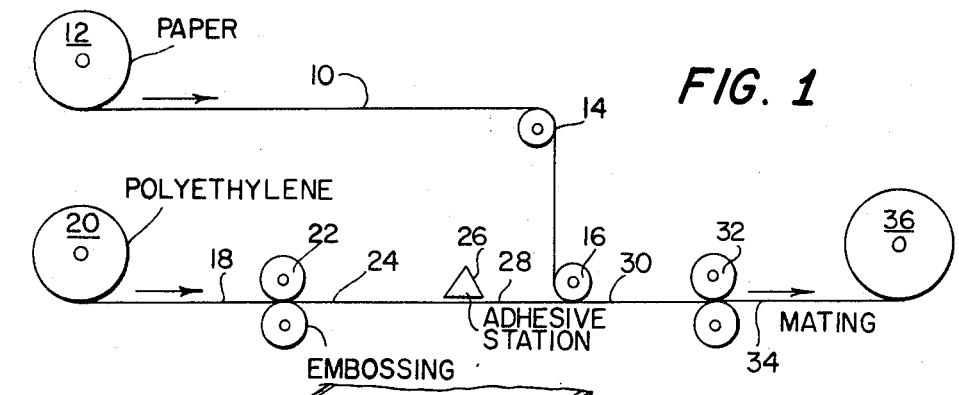
FIG. 1 is a schematic view illustrating the processing scheme of the present invention.

Referring to FIG. 1 of the drawings, there is illustrated in schematic a method for preparing laminates of the present invention. Tissue paper layer 10 is received from supply roll 12 and passed over tension roll 14 to joining roll 16.

The tissue paper layer of the laminate of this invention may be formed of one or more plies or layers of a facial grade tissue paper. The weight of the tissue paper suitable for use in the laminate depends upon the number of plies to be used. If only a single ply of tissue is to be used in the tissue paper layer, about 10 to about 16 pounds per ream of 3000 square feet of tissue paper may be used. If two or more plies are to be used, about 4 to about 16 pounds per ream of 3000 square feet of tissue paper may be used. The tissue paper layer may contain up to 4 plies of facial grade tissue paper, as desired. When paper layers are used, it is desirable that they be integrally associated to form an intact sheet composed of these several layers as is conventional with facial tissue. The preferred tissue paper for use herein is about 12 pounds per ream of 3000 square feet facial grade tissue paper and this weight of paper forms an exceptional disposable garment or bed linen material when laminated to preformed pre-embossed polyethylene film having a thickness of about 1 mil as described hereinafter.

A suitable thermoplastic film sheet 18, preferably a polyolefin, is continuously received from supply roll 20 indicated to be preferred polyethylene for use herein, which may be passed to embossing station 22 when the polyolefin film is desirably pre-embossed in a uniform manner. Less desirably, the film may be non-uniformly pre-embossed with some loss of feelability and appearance of the finally prepared laminate.

Although most any thermoplastic film may be used in the practice of this invention such as the well-known polyolefin films, including polypropylene, or copolymers containing ethylene and/or propylene groups; polyvinyl chloride, polyvinylidene chloride, polyesters, polyvinyl acetates, polyvinyl alcohol, and the like, in the most preferred embodiment the thin film is polyethylene.

It is essential that the plastic film layer be preformed, that is, not be formed by extrusion or calendering against the tissue paper layer. If the film layer is bonded to the tissue paper layer as it is formed into a film by extrusion a very weak structure is obtained. It is also essential for the purposes of the present invention that the preformed film layer be pre-embossed with a suitable embossing design so as to provide a multiplicity of valley and crests or ridges throughout substantially the entire surface of the film as will be described hereafter.

The film layer of the laminates of this invention is a thin film having a thickness of from about 0.2 to about 5 mils. The maximum thickness is typically limited only by the feelability of the ultimate product which may be prepared from the laminates of this invention, but the above range indicates the usual practical maximum. Preferably the plastic polyethylene film layer has a thickness of about 1 mil.

The embossing pattern of the rolls at embossing station 22 is desirably uniform such as a screen or block pattern, diamond pattern, triangular pattern or the like consistently applied over the area of the film layer. The embossing station may, less desirably, apply a non-uniform embossed pattern to the film if desired. It is generally found that by pre-embossing the film, there ultimately results a laminate as prepared herein having improved drape or clothlike appearance over laminates embossed subsequent to lamination. Further, it is found that the appearance of the present laminates is improved by pre-embossing the film with softer and better feelability.

Embossed film layer 24 is next passed to adhesive station 26 where an aqueous-base adhesive is sprayed onto the embossed film. A sprayer head may be used to apply the adhesive which may be received under pressure from an adhesive storage tank by a suitable pump or other reed means. The adhesive is desirably applied by spraying over substantially the entire surface of the film.

The adhesive used in accordance with this invention is an aqueous-base adhesive composition and preferably an aqueous emulsion of a synthetic adhesive. A wide number of commercially available aqueous-base adhesives are suitable for the practice of this invention. Preferably, however, the adhesive is one having a resin or latex base which will adhere polyethylene or other plastic films to paper. One useful adhesive formulation is an emulsion adhesive formed of about 70 parts by weight polyvinyl acetate and about 30 parts by weight dammar gum.

Adhesive coated film 28 passes to roll station 16 where it may contact paper layer 10. The laminate formed of paper and film 30 is next passed to mating station 32 where sufficient pressure is applied to laminate paper 10 to adhesive coated film 28. For best results, the pressure in the nip of the counter-rotating rolls of mating station 32 should be no greater than that required to lightly press the two or more layers of the laminate together. If necessary, where water is to be driven from the applied adhesive, suitable heaters may be included in the system if necessary.

Laminate 34 is rolled up on take-up roll 36 or is otherwise recovered and packaged or stored for later use.

Figure 2:
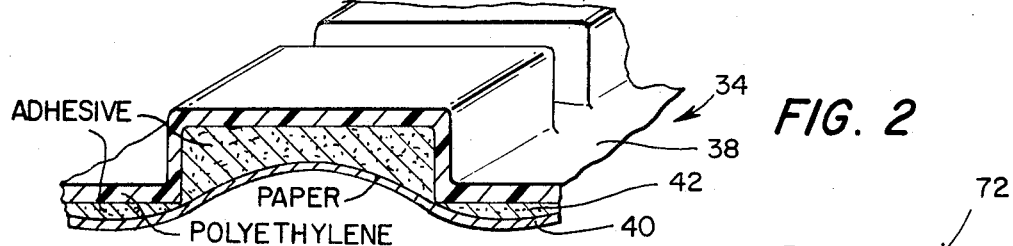
FIG. 2 is magnified sectional view taken in perspective of a laminate prepared by the mtehod of FIG. 1.

FIG. 2 illustrates laminate 34 prepared by the method described with regard to FIG. 1. Laminate 34 includes a layer of thermoplastic film 38 illustrated to be polyethylene and having secured thereto tissue paper layer 40 by adhesive 42.

Figure 3:
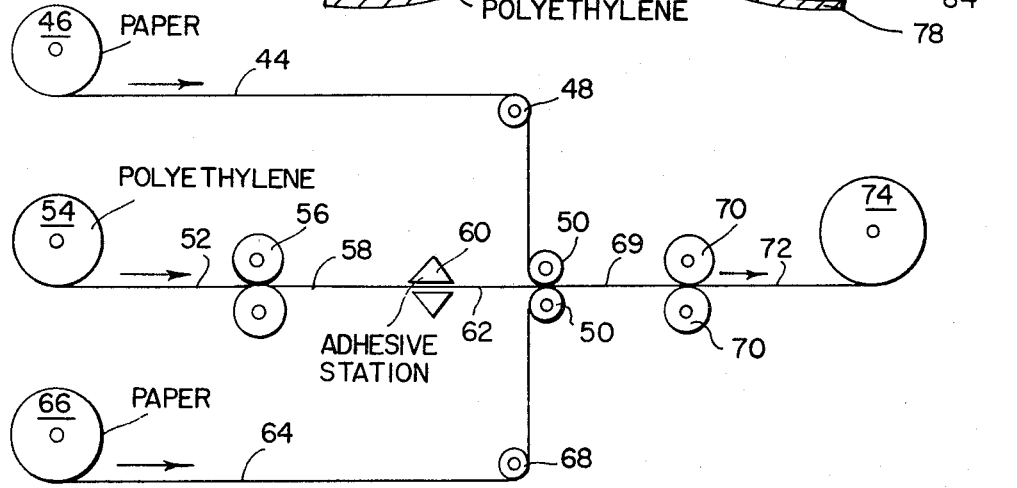
FIG. 3 is a schematic view depictng an alternate method for preparing the present laminates.

Referring to FIG. 3 of the drawings, there is illustrated in schematic an embodiment method for preparing laminates of the present invention. Tissue paper layer 44 is received from supply roll 46 and passed over tension roll 48 to joining rolls 50.

A suitable thermoplastic film sheet 52 preferably a polyolefin, is continuously received from supply roll 54 indicated to be preferred polyethylene for use herein, which is passed to embossing station 56 when the polyolefin film is desirably pre-embossed in a uniform manner. Less desirably, the film may be non-uniformly pre-embossed with some loss of feelability and appearance of the finally prepared laminate.

The embossing pattern of the rolls at embossing station 56 is desirably uniform such as that for embossing station 22.

Embossed film layer 58 is next passed to adhesive station 60 where an aqueous-base adhesive is sprayed onto two surfaces of the embossed film. A sprayer head may be used to apply the adhesive which may be received under pressure from an adhesive storage tank by a suitable pump or other feed means. The adhesive is desirably applied by spraying over substantially the entire surface of both sides of the film.

Adhesive coated film 62 passes to roll station 50 where it may contact paper layer 44. Simultaneously and continuously, a second sheet of tissue paper 64 similar to tissue paper 44 and 10, is received from roll 66 and passes over tension roll 68 to roll station 50 where it contacts adhesive coated film 62. The laminate 69 formed of tissue paper/plastic film/tissue paper is passed to mating station 70 where sufficient pressure is applied to laminate tissue paper 44 and tissue paper 64 to adhesive coated film 62. If necessary, water may be driven off from the adhesive by suitable heaters included in the system if desired.

Laminate 72 is rolled up on take-up roll 74 or is otherwise recovered and packaged or stored for later use.

Figure 4:
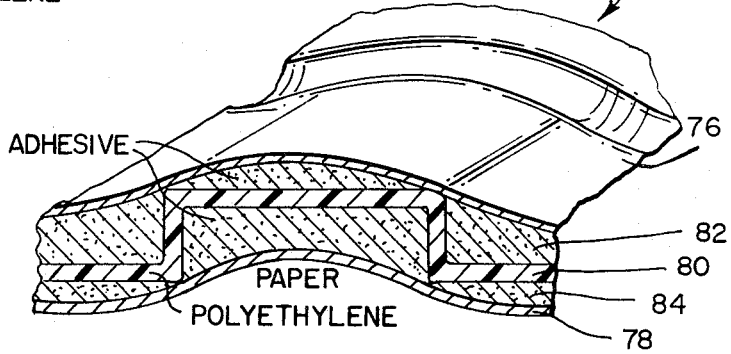
FIG. 4 is a magnified sectional view taken in perspective of an embodiment laminate prepared by the method of FIG. 3; and FG. 5 is a schematic view depicting an embodiment method for preparing the present laminates.

FIG. 4 illustrates laminate 72 prepared by the method described with regard to FIG. 3. Laminate 72 includes tissue paper layers 76 and 78 secured over thermoplastic layer 80 by adhesive layers 82 and 84.

FIG. 5 of the drawings illustrates in schematic an embodiment method for preparing laminates of the present invention. Tissue paper layer 110 is received from supply roll 108 and passed under tension roll 112 to mating roll 114. Simultaneously, a suitable pre-embossed thermoplastic film sheet 77 is continuously received from supply roll 76. Film sheet 77 from supply roll 76, pre-embossed with a surface pattern as previously described, is passed to tension roll 78 and direction control rolls 80 and 82 to tension roll 84. From tension roll 84, the sheet is passed between impression cylinder 86 and tint cylinder 88 where it receives from impression cylinder 86 a coating of latex base adhesive. Tint cylinder 88, in turn, receives adhesive 94 from transfer cylinder 90 by way of fountain roll 92 disposed in fountain 96.

Adhesive coated sheet 98 next passes over roll 100 where the adhesive is exposed to a current of heated air from dryer 102. Partially dry and tacky adhesive now appears on sheet 104 passing by direction roll 106 to mating roll 114 where by tension the sheet of thermoplastic material 104 coated with partially dried adhesive is joined to sheet 110. The lamination of sheets 115 next passes between impression cylinder 86 and pressure roll 116 from which the lamination is pressure bonded as lamination 117. Desirably, the pressure bonded lamination is further passed between pressure rolls 118 and 120 to increase the union of the layers forming lamination of sheets 122. The finally processed lamination of sheets are next permitted to pass over a tension roll 124 which generally appears to expose any minor defects in bonding between the lamination sheets and permits reuniting of these minor defects by removing adhesive resistive elements when passed partially about pressure 126, between pressure rolls 126 and 128, and partially about pressure roll 128 to re-winding roll 130. From roll 130, the lamination may be further processed as desired.

Disposable garments made from the new and unique laminates of this invention as described above are much stronger than known prior art disposable garments and have a more pleasant feel and design. The laminate of this invention has much greater strength than the heaviest permissible paper garments made solely from tissue paper material. Because of this improved strength characteristic disposable garments made from these laminates may have smaller arm and neck holes and thus provide improved privacy for the wearer. The improved strength characteristic also permits wider use applications of these laminates. For example, they may be used as disposable bed linen.

Another and equally important advantage of the laminates of this invention is the increased opacity thereof. Because of the shadowing and other optical characteristics of this new and unique laminate, garments made therefrom are more opaque than either the tissue layer or the plastic film layer by themselves or the sum of their opacities. Pebbling or other embossing operations on the surface of the pre-embossed plastic layer increase the opacity when light-colored materials are used.

The feel of garments or bed linen or other products made from the laminates of this invention is more comfortable as compared to like products made either from a heavy gauge self-sufficient tissue paper or a heavy plastic film having the desired opacity. If the plastic side of the laminate is found to be too cool against the skin of a wearer or bed user the laminate can be used to fabricate garments or other products where the warmer tissue layer surface is adjacent to the skin of the user. It will be apparent that final products fabricated from the laminate illustrated in FIG. 4, having a tissue paper layer on both sides of the film layer, will always have a paper layer adjacent to the skin of the user in garment form, or in bed linen form or otherwise.

Obviously, many modifications and variations of the invention as set forth above may be made without departing from the essence and scope thereof and only such limitations should be applied as are indicated in the appended claims.

Although a preferred embodiment of the invention has been illustrated herein, it is to be understood that various changes and modifications may be made in the construction and arrangement of elements without departing from the spirit and scope of the invention.

What is claimed is:

1. Article of manufacture suitable for use in fabrication of disposable garments, bed linen and the like consisting of (a) a thin thermoplastic film having a thickness of from about 0.2 to about 5 mils and pre-embossed throughout its surface area to provide a multiplicity of alternating valleys and ridges in the thickness of the film, (b) a layer of tissue paper on at least one side of and substantially coextensive in surface area with said plastic film, said tissue paper layer having a weight of at least about 8 pounds per ream of 3000 square feet, consisting of at least one and not more than 4 plies of tissue paper stock, each ply of said stock weighing from about 8 to about 16 pounds per ream of 3000 square feet, and (c) an intervening layer of adhesive between the said plastic film and each of said tissue paper layers, said adhesive layer consisting of the dried residue of an aqueous-base adhesive composition, said article being distinguished by especially high strength to weight ratio in both the length and width directions while retaining desired flexibility and feelability.

2. Article as defined in claim 1 wherein the thermoplastic film is polyethylene.

3. Article as defined in claim 2 wherein the polyethylene has a thickness of about 1.0 mil.

4. Article as defined in claim 3 having a tissue paper layer on one side only of the polyethylene film.

5. Article as defined in claim 4 wherein the intermediate adhesive layer is the dried residue of an aqueous polyvinylacetate emulsion adhesive.

References Cited
UNITED STATES PATENTS 2,897,109  7/1959  Voigtman _____ 161—165 X

FOREIGN PATENTS 774,810  1/1968  Canada _____ 161—249

WILLIAM A. POWELL, Primary Examiner

U.S. Cl. X.R.

156—209, 219, 324; 161—164, 165